UNITED STATES PATENT OFFICE.

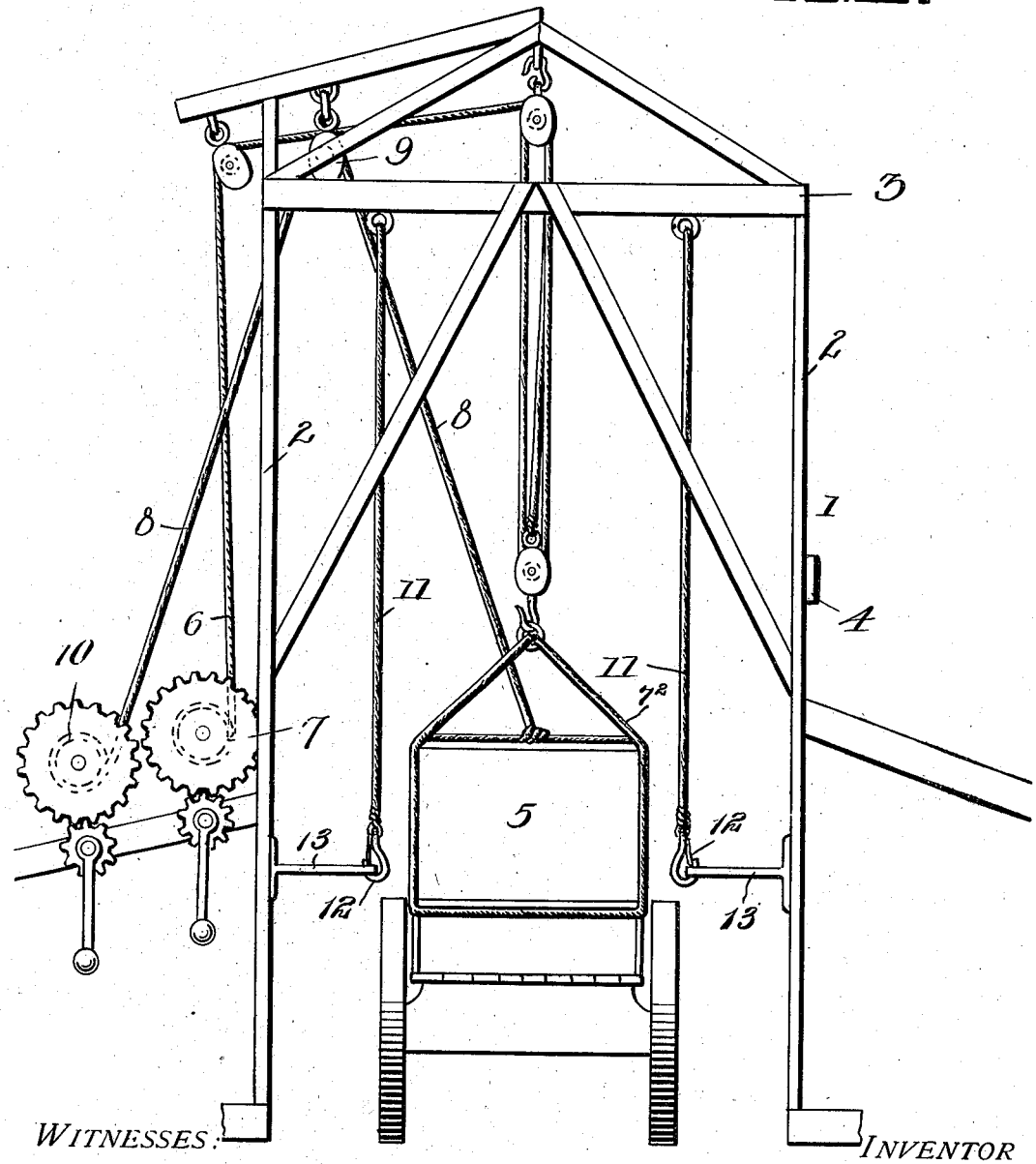

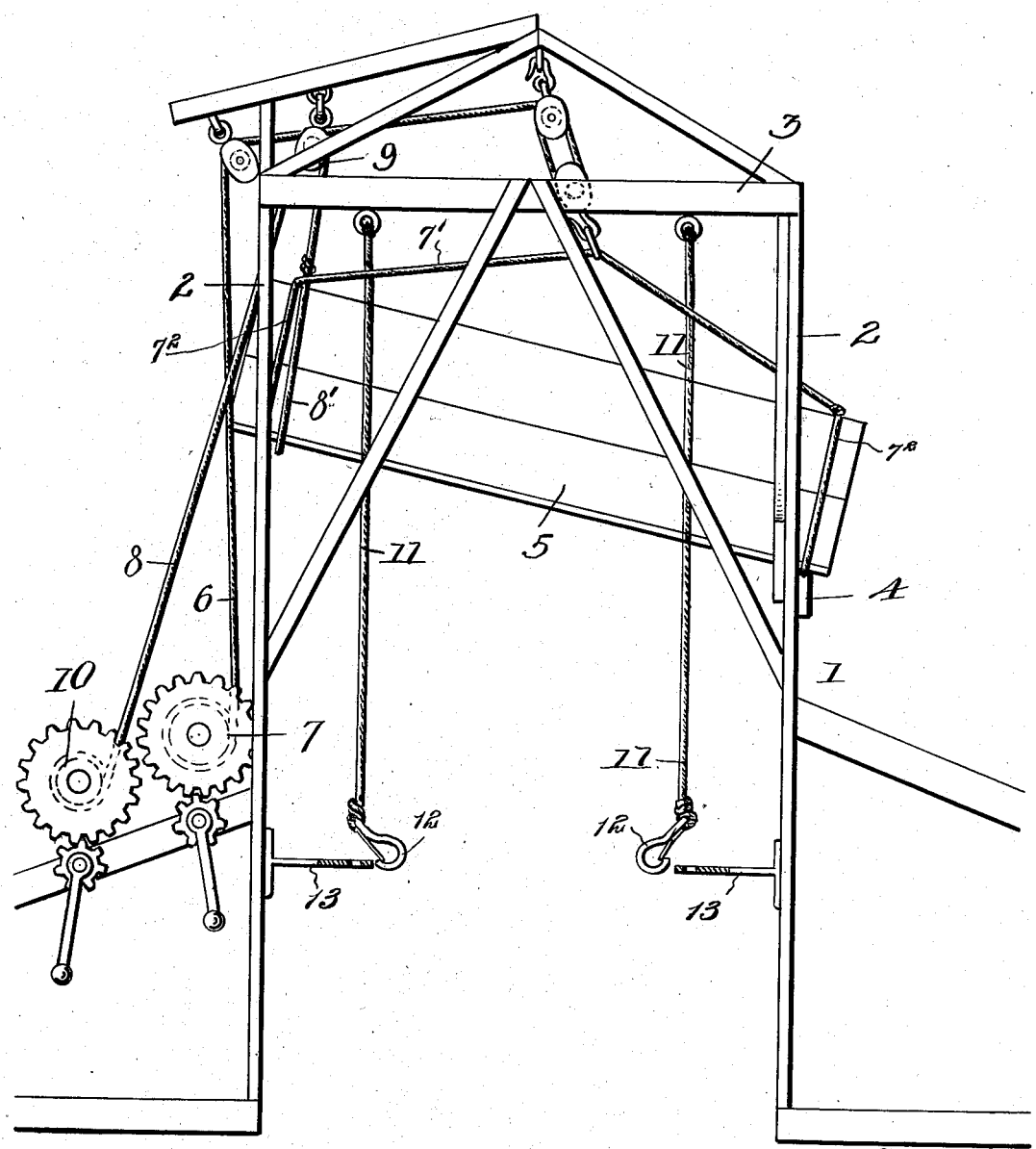

HARRY E. HAWKINS, OF PARKER, KANSAS.

LOADING DEVICE FOR GRAIN, &c.

No. 885,923.   Specification of Letters Patent.   Patented April 28, 1908.

Application filed August 26, 1907. Serial No. 390,181.

*To all whom it may concern:*

Be it known that I, HARRY E. HAWKINS, a citizen of the United States, residing at Parker, in the county of Linn and State of Kansas, have invented certain new and useful Improvements in Loading Devices for Grain, &c.; and I do declare the following to be a full, clear, and exact description of the invention, such as will enable others skilled in the art to which it appertains to make and use the same.

This invention has relation to new and useful improvements in loading devices, and, while it is specially adapted for use in loading grain cars, it may be used in any other connection where a device of this character could be advantageously employed.

In the drawings and specification the device will be, for the purpose of explanation, referred to as a device for elevating and dumping a wagon body, as this is probably the most common method in hauling grain to a grain car, but it may be employed for elevating and dumping any kind of a receptacle in which grain may be placed.

With this object in view, the invention consists of certain novel features of construction, combination and arrangement of parts as will be more fully described and particularly pointed out in the appended claims.

In the accompanying drawings, Figure 1 is an end view of the device for loading grain, constructed in accordance with the invention, showing the position of the wagon body while being raised; and Fig. 2 is a side view, showing the position of the wagon bed or body to discharge the grain.

In the embodiment of the invention, the frame 1 is shown for supporting the apparatus employed for hoisting and dumping the wagon body, said frame essentially comprising upright and cross members or pieces, 2 and 3, respectively. A cross supporting bar 4 is arranged between two of the upright members at a suitable point, the purpose of which will be disclosed. To elevate or raise the wagon bed or body, 5, I preferably employ a hoisting apparatus in the form of a block and tackle, 6, and a windlass, 7, which may be journaled to or near the frame in position to be operated easily by the operator in any suitable manner.

In the drawings the block and tackle is shown attached to the wagon bed or body by ropes, cables or other flexibles, adapted to be passed under the same, but I do not limit myself to such method of attachment, as various other means may be employed.

The dumping apparatus comprises a cable, 8, or other flexible member, attached to the front end of the body, preferably by being passed under the same and passing over pulleys, 9, arranged near the upper end of the frame in any suitable manner, and a windlass, 10, journaled to or near the frame in any suitable manner in a position to be easily operated by an operator for winding up said rope or cable.

Instead of employing a windlass in connection with the block and tackle for raising or hoisting the wagon bed or body, other means may be employed, for instance, a pulley may be arranged near the lower end of the frame, the free end of the tackle arranged to pass under the pulley, and a team of horses or other draft animals hitched to the tackle.

In practice, the wagon bed or body is hoisted until at the desired height and then swung at right angles by winding up the cable, or other flexible member, 8, the tail end of the wagon being supported by the cross supporting bar, 4. This done, the operator continues to wind up the said cable or other flexible member until the rear end of the wagon body has been sufficiently elevated to cause the body to assume the desired angle to discharge the grain by means of a chute into a grain car, when the tail piece is removed.

The ropes 11 or other suitable means are attached at their upper ends in any suitable manner to the upper end of the frame and are removably attached at their lower ends in any suitable manner and constitute a guide for the wagon bed or body, as it is being raised. After the body has been raised to the desired height, the lower ends of the ropes or other flexible members are detached to permit the body to be swung by the dumping apparatus.

Having thus particularly described my invention, what I claim as new and desire to secure by Letters-Patent, is:—

A device of the character specified, embracing a supporting frame, comprising upright frame members, hoisting apparatus operatively sustained by the frame, a flexible connecting element formed at its ends with loops for receiving or encircling opposite ends of a receptacle, said element constituting means for connecting the hoisting apparatus therewith, apparatus for raising the receptacle in dumping position, and for elevating and supporting one end thereof, after the receptacle has been swung in such position, said apparatus comprising a flexible element formed with a loop for receiving one end of the receptacle, a cross supporting member arranged between two of the upright frame members for supporting the opposite end of the receptacle when the latter is swung into dumping position and flexible guide elements for guiding the receptacle during the operation of raising it into or lowering it from dumping position with means for detachably connecting the free ends of the guide elements with the supporting frame.

In testimony whereof I have hereunto set my hand in presence of two subscribing witnesses.

HARRY E. HAWKINS.

Witnesses:
 B. C. LEWELLYN,
 E. A. STEELE.